Dec. 16, 1952  B. W. JONES  2,621,563
MICROSCOPE NOSEPIECE
Filed Nov. 22, 1950  2 SHEETS—SHEET 1
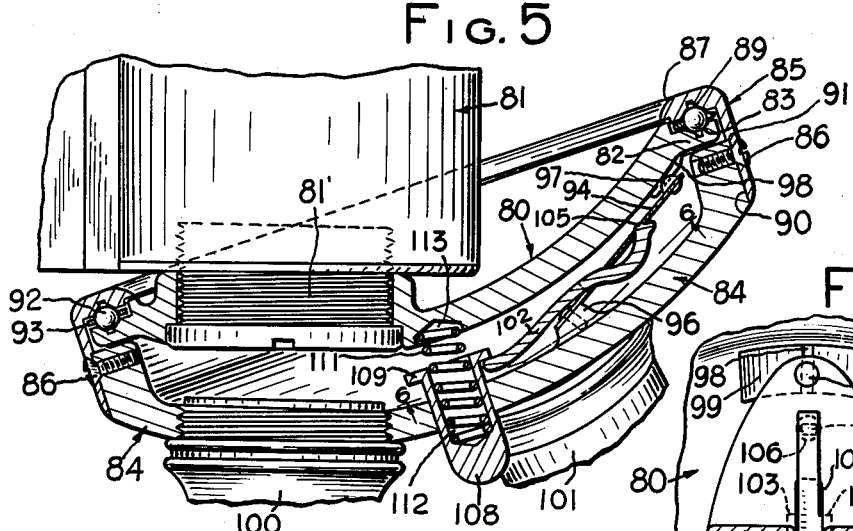
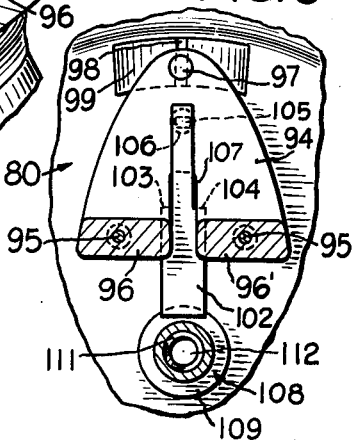
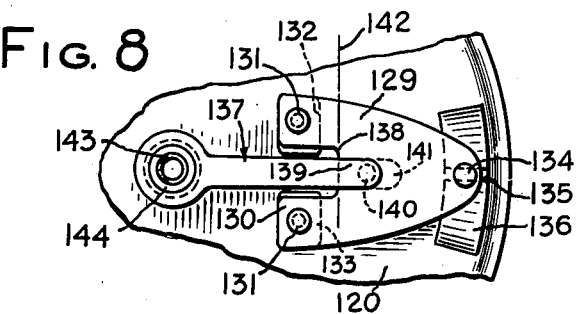
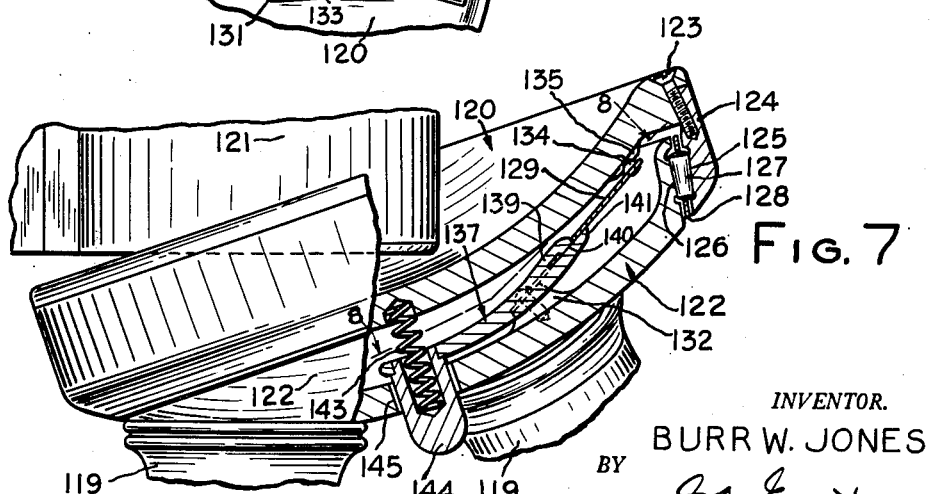
INVENTOR.
BURR W. JONES
BY
ATTORNEY Dec. 16, 1952     B. W. JONES     2,621,563
MICROSCOPE NOSEPIECE
Filed Nov. 22, 1950     2 SHEETS—SHEET 2
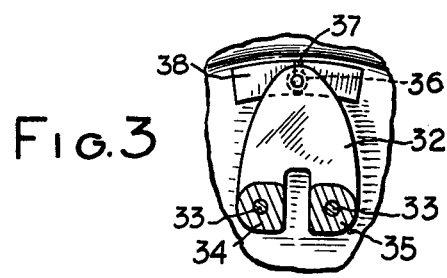
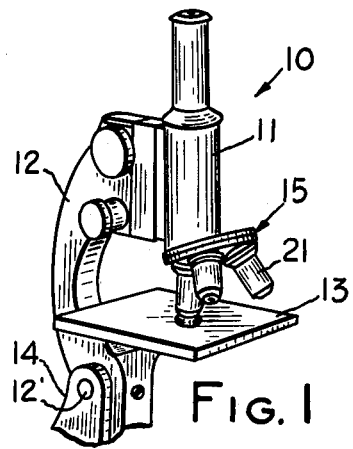
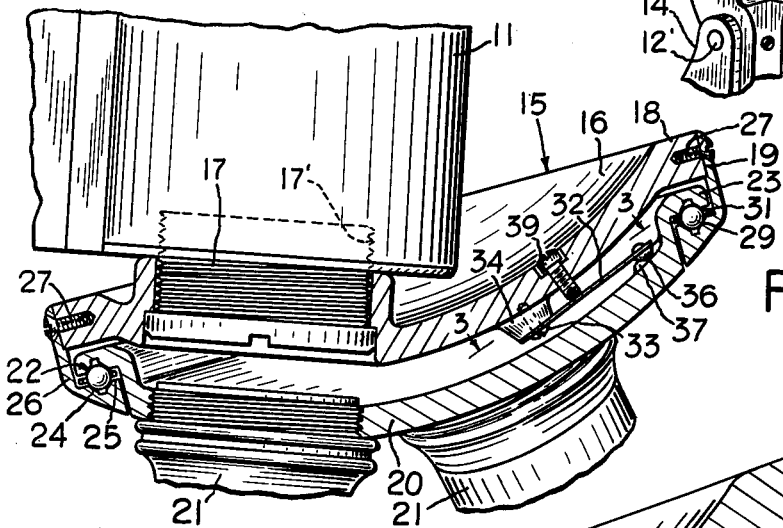
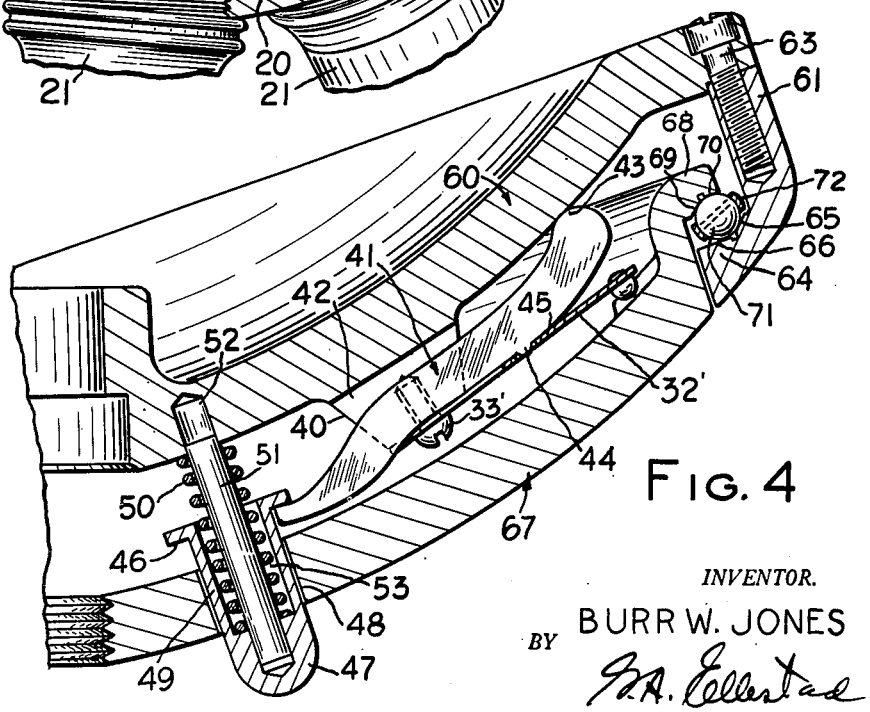
INVENTOR.
BURR W. JONES
BY
ATTORNEY Patented Dec. 16, 1952

2,621,563

UNITED STATES PATENT OFFICE 2,621,563

MICROSCOPE NOSEPIECE

Burr W. Jones, Rochester, N. Y., assignor to Bausch & Lomb Optical Company, Rochester, N. Y., a corporation of New York Application November 22, 1950, Serial No. 196,997

4 Claims. (Cl. 88—39)

1

This invention relates to improvements in microscope nosepieces of the rotary type that carry a plurality of objective lenses of different powers which may be selectively moved into viewing position.

In such a nosepiece, it is necessary that all of the various objectives be so held during use as to be perfectly aligned on the optical axis of the instrument. This requirement is necessary so that any feature of the specimen, which is located in a particular place in the field of view by the use of an objective of one magnification, will also appear in that same place when an objective of different magnification is used. Failure of a microscope nosepiece to provide such a result is due to several causes, a large part of which is traceable to looseness or shake in the nosepiece bearings and detent mechanism. Conventional nosepieces which employ a central pivot and bearing structure for supporting the objective carrier are usually incapable of performing in the desired manner over long periods of use. Likewise, customary types of detent mechanism fail to hold the objective carrier in a precise angular position which is repeatable from time to time.

It is an object of this invention to provide a novel microscope nosepiece of the above-mentioned type having means for rotatably supporting an objective carrying shell on a stationary shell substantially without shake or undesirable looseness.

A further object is to provide such a device in which the bearing mechanism and the detent mechanism which hold the objective carrying shell in proper angular position are so constructed that the detent force acts to preload the bearing mechanism.

A further object is to provide a microscope nosepiece wherein the detent mechanism is housed entirely inside of a dust-tight nosepiece for the purpose of protecting its parts from mechanical or other injury.

A still further object is to provide such a device which is composed of a small number of parts of simple form and is easy to use, assemble and service and which remains permanently adjusted.

Further objects and advantages will be found in the novel details of construction and combination of parts as described in the specification below and shown in the accompanying drawings.

Fig. 1 is a general perspective view of the upper part of a microscope, showing a nosepiece which incorporates my invention,

2

Fig. 2 is a fragmentary enlarged side view, partly in section of one form of my invention, Fig. 3 is a fragmentary sectional view, taken on the line 3—3 of Fig. 2, Fig. 4 is an enlarged fragmentary side elevation, partly in section, of another form of my invention, Fig. 5 is a view similar to Fig. 2 of still another form of my invention, Fig. 6 is a fragmentary sectional view taken on line 6—6 of Fig. 5.

Fig. 7 is an enlarged side view, partly in section, of a modification of the structure shown in Fig. 4, and Fig. 8 is a sectional view, taken on the line 8—8, of Fig. 7.

A microscope, embodying my invention, is shown generally by numeral 10 in Fig. 1 of the drawings, and it comprises a body tube 11 mounted on an arm 12 to which a stage 13 is fixed in any desired manner. The arm 12 is secured to a base 14 (fragmentarily shown) by an inclination joint 12' so as to support said arm and body tube. At the bottom of the tube 11, a nosepiece, generally indicated at 15, is secured by suitable means such as described herebelow.

According to my invention, a stationary supporting member or shell 16 (Fig. 2) of circular convex-concave form is demountably attached to tube 11 by a clamping sleeve 17 which is threaded at 17' into said tube. The peripheral portion of shell 16 is formed with a radial flange 18 having a cylindrical outer surface 19 on which a complementary part is fitted as hereinafter described. A second convex-concave member or shell 20, shaped somewhat similarly to the first shell, is rotatably mounted thereon in spaced relation thereto and carries a plurality of objective lenses 21 so that any one of said objectives may be selectively moved into operating position beneath tube 11.

In the preferred form shown in Fig. 2, an upper ball race 22 is formed on the under side of an annular peripheral projection 23 on the lower shell 20 and a cooperating lower ball race 24 is formed on an inwardly projecting part 25 on a coupling ring 26. The ring 26 is fitted on surface 19 of the upper shell 16 and is held in any suitable manner, such as by screws 27 which project through the ring and are threaded into the flange 18. A plurality of anti-friction balls 29, separated by a ball spacer 31, completes the ball bearing mechanism. For the purpose of precisely holding the lower shell 20 in concentric relation to the upper shell 16, the surfaces of the ball races 22 and 24 are formed as shown in the drawings at a steep angle to the axis of rotation of shell 20. The lower shell thus, in effect, rests on the upper shell by gravity without the use of a connecting center bolt or the like.

Another feature of this invention is the structure and arrangement of the detent mechanism by which the shells 16 and 20 are held angularly in proper operating position relative to each other with the objective 21 properly aligned on the optical axis of the instrument. This mechanism is located in the space between the shells so as to protect this mechanism and so that the operating force of the detent also serves to preload the bearing mechanism. To accomplish this result, a flat detent spring 32, shown in plan view in Fig. 3, is secured by any suitable means such as rivets or screws 33 to a pair of mounting bosses 34 and 35 which protrude downwardly from the inner surface of the upper shell 16. The spring arm 32 extends radially outward toward the annular flange 18 and carries at its outer end a suitable contactor 36 which engages a detent groove 37 that is formed in each of several equi-spaced raised portions or ramps 38 on the inner face of the lower shell 20.

The number of ramps 38 corresponds to the number of objectives 21 and the spring arm 32 is so adjusted with regard to the height of the ramps that the contactor 36 does not drag on the surface of shell 20 when said shell is rotated out of operative position. If desired, an adjusting screw 39, which is threaded through the upper shell 16 in a direction to bear against the flat spring 32, may be used for adjusting the pressure of the contactor 36 in the groove 37.

It is particularly important that the detent contactor 36 be seated very firmly in the groove 37 to insure good angular alignment of the objectives 21 with the optical axis of the instrument. When the detent spring 32, such as shown in Fig. 2, is made thick and strong enough to make certain that there is no lost motion or shake in the detent mechanism, the spring pressure is then too heavy for easy rotation of the nosepiece. To avoid this condition, auxiliary pressure means for the detent mechanism as shown in Fig. 4 are provided comprising a lever 41 which is slidably arranged in a straight-sided slot 42 formed by the adjacent sides of bosses 40, formed on the upper shell 60 similar to the bosses 34 and 35 aforementioned. On the short lever arm end of the lever 41, said lever is fulcrumed about a projection 43 which bears against the upper shell 60 and is demountably secured at an intermediate point to a detent spring 32' by a lug 44 which engages in a hole 45 in said spring. The inner end of the lever 41 extends beneath a radial shoulder 46 formed on the upper end of a release knob or thimble 47 which extends through a guide opening 48 in the lower shell 67. The shank 49 of knob or thimble 47 is long enough to provide for sufficient releasing movement of the lever 41. Pressure is normally applied to said lever by a compression spring 50 that is placed under initial compression between the upper shell 60 and knob 47. Further guide means for the thimble 47 may be provided if desired, comprising a stem 51 anchored in the thimble and slidably engaging a bore 52 in the upper shell 60. The spring 50 is seated at its upper end against shell 60 and at its lower end within a counterbored recess 53 in thimble 47.

In Fig. 4 of the drawing is also shown a modification of the bearing mechanism shown in Fig. 2, comprising a supporting shell 60 having a depending rim member 61 serving as a coupling ring, which is fixed thereto by cap screws 63. The bottom portion of the member 61 projects inwardly to form a ledge 64 on which a ball race is formed. In this modification, only a bearing surface 65 is inclined to its axis of rotation, the other bearing surface 66 being substantially normal to its axis of rotation. On an objective-carrying shell 67 which is axially spaced from shell 60 is formed a short radial flange 68 which is provided with a cooperating ball race comprising one inclined bearing surface 69 and one substantially radial surface 70 similar to the opposite ball race. Bearing balls 71, separated by a ball spacer 72, are interposed between these ball races to carry the loads due to the lower shell, and other loads associated therewith including the detent pressure.

It should be understood that in Fig. 4, both the bore 52 and guide opening 48 are loosely fitted to the thimble mechanism so that the sole means for centering shell 60 on shell 67 is by the inclined bearing surfaces 65 and 69.

With reference to the form of bearing and detent structures shown in Figs. 5 and 6, a convex-concavo supporting shell or member 80 is demountably secured to a microscope tube 81 by a clamping sleeve 81' which is threaded into said tube. On the peripheral part of the shell there is a radial flange 82 on which is formed a ball race 83. An objective-carrying shell or member 84 is rotatably mounted in spaced relation below the shell 80 by means of a coupling ring 85 which is fixed to the periphery of shell 84 by screws 86. The upper part of the ring 85 extends inwardly over the peripheral flange 82 to provide a rib 87 on the under surface 88 of which is formed a ball race 89 in cooperative relation to ball race 83.

The bearing surfaces of the races 83 and 89 are inclined to their axis of rotation similarly to that shown in Fig. 2 and are so formed for the same purpose. To space the races 83 and 89 apart at the proper working distance, the ring 85 is counterbored at 90 to form a shoulder 91 which abuts against the upper outward edge of the lower shell 84. A plurality of anti-friction balls 92, spaced apart by a ball spacer 93, are held in contact with ball races 83 and 89 by the above-described mechanism.

Another modification of the heretofore-described detent mechanism is shown in Figs. 5 and 6 wherein a flat detent spring 94 is anchored by suitable means such as screws or rivets 95 to a pair of upstanding bosses 96, 96' which are formed on lower shell 84 in spaced relation to each other. The free end of spring 94 extends radially outwardly, as best shown in Fig. 6, and a rounded detent button 97 is secured to the end in such a position that it may engage with a detent stop groove 98 formed in each of several ramps 99 which are preferably integrally formed in equi-angular positions on the upper shell 80. Ramps 99 correspond in number to the number of objectives 100 and 101 which are held on shell 84.

For the purpose of applying auxiliary pressure to the detent mechanism and also for preloading the bearings, a lever 102, Fig. 5, is fulcrumed upon spring 94 by means of the intermediate shoulders 103 and 104 which project laterally from the lever 102. At the tip of the short arm of lever 102 is formed a projection 105 which engages in a hole 106 in spring 94 to position said lever lengthwise and transversely. The long arm of the lever 102 extends through an open slot 107 formed in the anchored end of spring 94 so as to facilitate lateral positioning of the lever.

A thimble 108 is slidably mounted in lower shell 84 and said thimble is provided with a radial flange 109 which bears against the long arm of lever 102. In order to provide the aforesaid auxiliary pressure on the long arm of lever 102, a compression spring 111 is preferably seated at its lower end in a recess 112 in thimble 108 and at its upper end in a recess 113 in shell 80. Said thimble is extended below shell 84 sufficiently to serve as a readily accessible release button having the necessary travel for actuating lever 102.

Further modifications of the above-described bearing and detent mechanism are shown in Fig. 7 wherein a supporting shell 120 is secured to a microscope tube 121 in a manner similar to that shown in Fig. 5. An objective-carrying shell 122 having objectives 119 secured thereon is rotatably mounted on the supporting shell 120 by means of a tapered roller bearing mechanism which not only carries the load of the rotating shell but also keeps its axis accurately centered and erect. On the peripheral part of shell 120, is fixed by suitable means such as screws 123 a downwardly projecting rim member 124 which carries on its inner portion an inclined annular bearing race 125. Opposite to bearing race 125 is a companion inclined bearing race 126 formed on the peripheral surface of the lower shell 122. The inner race 126 is somewhat more acutely inclined to its axis of rotation than outer race 125 and both of these races are conically formed at a suitable angle so as to accommodate a plurality of tapered anti-friction rollers 127 which are separated by a spacer member 128.

The detent mechanism shown in Fig. 7 comprises a flat spring 129 (shown also in Fig. 8) anchored at its inner end 130 by suitable means, such as rivets 131, to a pair of upstanding separated lugs 132 and 133 in a similar manner to that shown in Fig. 5. On the free end of spring 129, a detent button 134 is fixed and a detent groove 135 is formed radially in shell 120, in cooperative relation to the contact button in each of a plurality of equally spaced ramps 136 similar to those heretofore described in connection with Fig. 5. A pressure-multiplying lever 137 is arranged to operate freely in the space between the lugs 132 and 133 so as to augment the normal pressure of the detent spring 129. This lever lies in an open ended slot 138 formed in the base of the flat spring 129 and is secured to the spring by any preferred means such as the bifurcations 139 and 141 which are forced together so that a spot on one of the arms is upset into a hole 140 in the spring. The lever 137 fulcrums approximately around the flexure line 142 of the spring 129. The long arm of the lever 137 is forced downwardly by a compression spring 143 seated at one end against the upper shell 120 and at the other end in a thimble 144 which is the release button and is suitably fixed in the inner end of the lever. Thimble 144 extends through a clearance hole 145 in the lower shell 122 a sufficient distance below said shell to afford adequate travel in serving as a release button for releasing the pressure that is supplied by the spring 143.

In assembling the bearing structures shown in Figs. 2, 4 and 7, the lower shell is inverted, the bearing balls or rollers, as the case may be, are laid on the lower shell bearing race together with their spacer member. Then the coupling ring is placed over the balls or rollers so as to complete the bearing and the ring is pressed onto the upper shell and secured thereto by holding screws as illustrated in the drawing. No further adjustment of these parts is necessary. The assembly of the parts of the invention shown in Fig. 5 is accomplished by holding the upper shell 80 upright, placing the balls 92 and ball spacer 93 in position on the ball race 83 and dropping the coupling ring 85 over the shell 80 so as to complete the bearing. Clamping sleeve 81' is then inserted in the opening in the upper shell 80 and the lower shell 84 is pressed into the coupling ring 85 and secured in place by screws 86.

In the above-described assembly, the associated detent mechanism is assembled onto the shell on which it is held just before that shell is assembled with the other shell. In the form of detent mechanism shown in Fig. 4, the assembly operation is started by placing the spring 49 in the thimble 47 and inserting the stem 51 of the thimble in the bore 52 in shell 67. While holding spring 49 compressed, the lever 41 is inserted in the slot 42 where it is held while anchoring the base of the flat spring 32' onto the bosses 40 by the screws or rivets 33' so as to hold the spring 49 under compression. Then the lower shell 67 is assembled as above outlined. Likewise the detent mechanism of Figs. 5 and 7 is similarly assembled first on their respective shells 84 and 122 before assembling the upper and lower shells together.

Since the detent mechanism is located between the fixed and rotatable members, it functions not only as a stop or locating mechanism but also as a means for preloading the bearing members. When the auxiliary spring pressure device is employed, the auxiliary pressure may be temporarily released by depressing the slidable thimble and thereby permitting the lower shell to be turned more easily when selectively locating the objectives in operative position.

It will be seen that the above-described bearing mechanism and detent mechanisms are so constructed and arranged as to cooperate with each other in eliminating from the movements of such a nosepiece substantially all unwanted lost motion which might contribute to the lack of centration or axial alignment of the objectives with the optical axis of the microscope when they occupy their operative positions. Furthermore, the double purpose of the detent spring, namely, forcing the detent contactor firmly into its seat and preloading the ball bearings with an increased load when the objectives are in operative position, is a major reason why a nosepiece embodying this invention is capable of correctly aligning the objectives with a high degree of precision.

Although but certain embodiments of this invention have been shown and described in detail, other embodiments and modifications are possible and changes may be made in the form and arrangements of the parts without departing from the spirit of the invention as defined in the appended claims.

I claim:

1. A microscope nosepiece comprising a support member adapted to be detachably secured to a microscope body tube, a second member mounted on the support member to turn about an axis, said second member carrying objective lenses, an annular peripheral bearing portion on one of said members, a peripheral part on the other member extending inwardly toward said axis, an annular peripheral bearing portion on said part, a bearing surface on each bearing portion, said bearing surfaces being disposed opposite to each other and inclined toward the axis, said bearing surfaces being in converging relation to each other, anti-friction elements held between the surfaces and in rolling contact therewith, the central portions of said members having inner surfaces in opposed spaced relation, and spring pressure means for urging the bearing surfaces into engagement with the elements, said means comprising resilient means carried on the inner surface of one member and resiliently engaging the opposed inner surface of the other member.

2. A microscope nosepiece comprising a support member adapted to be detachably secured to a microscope body tube, a second member mounted on the support member to turn about an axis, said second member carrying objective lenses, an annular peripheral bearing portion on one member, a peripheral part on the other member extending inwardly toward said axis, an annular peripheral bearing portion on said part, a bearing surface on each bearing portion, said bearing surfaces being disposed opposite to each other and inclined toward the axis, said bearing surfaces being in converging relation to each other, anti-friction elements disposed between said surfaces and in rolling contact therewith, the central portions of said members having inner surfaces in opposed spaced relation, a flat detent spring having one end carried by the inner surface of one member, detent means carried by the inner surface of the other member, the other end of the detent spring having a part which yieldably engages the detent means whereby the lenses may be selectively located in operative relation and the bearing surfaces are urged into contact with the elements.

3. The structure recited in claim 2 and having auxiliary spring pressure means comprising a thimble slidably mounted in an aperture centrally disposed in the second member, a compression spring having one end positioned within the thimble and the other end in operative engagement with the support member, a lever having one end portion operatively connected to the thimble and another end portion operatively connected to the detent spring, said compression spring normally acting through the lever to apply additional pressure to the detent spring, while movement of the thimble toward the support member will release said additional spring pressure on the detent spring.

4. The structure recited in claim 2 and having auxiliary pressure means comprising a thimble slidably mounted in a centrally positioned aperture in said second member, a stem anchored within the thimble and slidably engaging a bore formed on the opposed surface of the support member, a compression spring mounted within the thimble and encircling the stem, one end of the compression spring being in yieldable engagement with the inner face of the support member, a shoulder on said thimble, a pair of spaced bosses on the inner face of the support member, a lever positioned between said bosses, one end of the lever being positioned under said shoulder, the other end of the lever engaging said detent spring whereby the compression spring normally applies additional pressure to the detent spring while movement of the thimble will release said additional pressure on the detent spring.

BURR W. JONES.

REFERENCES CITED

The following references are of record in the file of this patent:

UNITED STATES PATENTS

| Number | Name | Date |
|---|---|---|
| 1,023,390 | Ott et al. | Apr. 16, 1912 |
| 1,428,990 | Sloan | Sept. 12, 1922 |
| 2,000,090 | Mitchell | May 7, 1935 |

FOREIGN PATENTS

| Number | Country | Date |
|---|---|---|
| 233,410 | Great Britain | May 6, 1925 |
| 436,735 | Germany | Nov. 8, 1926 |